United States Patent
Fells

(10) Patent No.: US 8,238,125 B2
(45) Date of Patent: Aug. 7, 2012

(54) POWER SYSTEM

(75) Inventor: Julian Andrew John Fells, Horsham (GB)

(73) Assignee: Access Business Group International LLC, Ada, MI (US)

( * ) Notice: Subject to any disclaimer, the term of this patent is extended or adjusted under 35 U.S.C. 154(b) by 458 days.

(21) Appl. No.: 12/601,434

(22) PCT Filed: May 27, 2008

(86) PCT No.: PCT/GB2008/001793
§ 371 (c)(1),
(2), (4) Date: Nov. 23, 2009

(87) PCT Pub. No.: WO2008/145982
PCT Pub. Date: Dec. 4, 2008

(65) Prior Publication Data
US 2010/0172168 A1      Jul. 8, 2010

(30) Foreign Application Priority Data

May 25, 2007    (GB) .................................. 0710057.1

(51) Int. Cl.
*H02M 1/12*      (2006.01)
*H02J 3/01*      (2006.01)

(52) U.S. Cl. .......................................... 363/40; 363/16
(58) Field of Classification Search .................. 363/15, 363/16, 39, 40, 41, 42, 43, 95, 97, 98, 131, 363/132
See application file for complete search history.

(56) References Cited

U.S. PATENT DOCUMENTS

| | | | |
|---|---|---|---|
| 5,656,924 A | | 8/1997 | Mohan et al. |
| 5,745,355 A | * | 4/1998 | Tracy et al. ..................... 363/71 |
| 5,991,181 A | * | 11/1999 | Fujii et al. ....................... 363/97 |
| 6,903,948 B2 | * | 6/2005 | Yoshida et al. ................. 363/95 |
| 6,937,488 B2 | * | 8/2005 | Eguchi ............................. 363/97 |
| 7,123,495 B2 | * | 10/2006 | Endou et al. ..................... 363/98 |
| 7,778,052 B2 | * | 8/2010 | Serpa et al. ..................... 363/40 |
| 7,855,526 B2 | * | 12/2010 | Ohnishi et al. ................ 318/800 |
| 8,064,233 B2 | * | 11/2011 | Ishizu et al. .................... 363/97 |
| 2003/0214821 A1 | | 11/2003 | Giannopoulos et al. |
| 2005/0035815 A1 | | 2/2005 | Cheng et al. |
| 2005/0057949 A1 | | 3/2005 | Kim et al. |

FOREIGN PATENT DOCUMENTS

EP          0533247           3/1993

OTHER PUBLICATIONS

B.N. Singh, B. Singh, A. Chandra and K. Al-Haddad, Design and Digital Implementation of Active Filter with Power Balance Theory, IEE Proc.-Electr. Power Appl., vol. 152, No. 5, Sep. 2005.
International Search Report and Written Opinion for International Application No. PCT/GB2008/001793 dated Mar. 24, 2009.

* cited by examiner

*Primary Examiner* — Gary L Laxton
(74) *Attorney, Agent, or Firm* — Warner Norcross & Judd LLP

(57) ABSTRACT

The specification discloses a wireless power charging system in which undesired frequencies in the primary coil are cancelled. Exemplary undesired frequencies are the harmonics of the primary coil drive signal. The system includes a sense transformer/coil, an injection transformer/coil, and a compensation signal generator. The sense transformer/coil senses the signal in the primary coil. The compensation signal generator receives the sensed signal and generates an injection signal whose constituent parts are equal in amplitude to, but pi phase different from, each undesired frequency. The combined signal is injected into the primary through the injection transformer/coil so that the injection signal cancels the undesired frequencies in the primary coil.

36 Claims, 17 Drawing Sheets

POWER SYSTEM

BACKGROUND OF THE INVENTION

The present invention relates to wireless power transfer systems, and more particularly to such systems incorporating circuitry and/or methodologies for attenuating or cancelling undesirable spurious signals, such as harmonics.

A wireless power transfer system 10 for transferring power from a charger 12 to a portable device 14 is shown in FIG. 1. There is a DC power source 16 in the charger 12 which is converted to an alternating current using an inverter 18. Typically a half-bridge circuit is used to generate a rectangular signal of either high voltage and/or high current. This signal is applied to a primary inductive coil 20. Within the portable device 14 there is a secondary coil 22 which is electromagnetically coupled to the primary coil 20 when the device is appropriately positioned on the charger 12. An alternating voltage is induced within the secondary coil 22. This voltage may be rectified using a diode bridge 24 to provide a DC voltage. This DC voltage may require some subsequent DC/DC conversion (not shown) to provide a voltage suitable for recharging the internal batteries (not shown) and powering the device 14.

In order to make the system 10 easier to drive, it is common to use resonance on the primary 20 and/or the secondary 22. Capacitors 26 and/or 28 may therefore be positioned on the primary and secondary side respectively, such that both the primary side and secondary side are resonant at the frequency of the inverter 18. An additional feature of this resonance is that it acts as a band-pass filter, thereby attenuating the unwanted harmonic components present in the rectangular signal.

In a wireless charger, it is inevitable that any frequency components present on the primary coil will be radiated into the atmosphere, because it is not possible to adequately shield the coil and still permit coupling to a portable device. It is therefore necessary to select a fundamental frequency in a band where emissions are permitted by legislation. However the primary inductor can act as a very efficient antenna at higher harmonics and this can cause unwanted interference. This is true even when the harmonics are attenuated by the resonant system, because the fundamental has to be high enough to supply sufficient power to the portable device.

A further issue which can exacerbate the situation is that a rectifier is required in the portable device. This is typically a nonlinear component which is directly coupled to the primary coil. Harmonics are generated by the rectifier and coupled back into the primary coil where they are radiated.

SUMMARY OF THE INVENTION

The aforementioned problems are overcome in the present invention wherein the primary side of a wireless power charging system includes a compensation signal generator to cancel undesired frequencies, for example due to harmonic distortion and intermodulation distortion. The system provides an alternating current (AC) signal with low distortion.

According to a first aspect of the invention there is provided apparatus for providing an alternating current signal with low distortion, comprising:
    an inverter for producing a first signal with at least a component of power at a first frequency;
    a compensation signal comprising frequencies other than the first frequency;
    means for coupling the compensation signal into the inverter output;
    a power detector for detecting power in frequencies other than the first frequency;
    means for coupling a proportion of the first signal from the inverter output to the power detector;
    means for adapting the compensation signal to minimise the power at frequencies other than the first frequency at the power detector.

This aspect has the advantage that is possible to use a switched method to generate a pure signal without distortion from either the switching process or other linear or nonlinear components within the system.

The inverter may in isolation produce a substantially rectangular signal.

The inverter may be driven by a reference oscillator.

The compensation signal may be a harmonic or a series of harmonics of the reference oscillator.

The compensation signal may be adapted by varying the amplitude and/or phase of the individual frequencies present.

The amplitude and/or phase of the frequencies may be adjusted together using a digital filter.

According to a second aspect of the invention there is provided a method for providing an alternating current signal with low distortion comprising:
    providing a first signal with at least a component of power at a first frequency;
    providing a compensation signal comprising frequencies other than the first frequency;
    coupling the compensation signal to the first signal;
    detecting power in frequencies other than the first frequency in the first signal
    adapting the compensation signal to minimise the detected power.

According to a third aspect of the invention there is provided apparatus for transmitting power wirelessly by electromagnetic induction comprising:
    an inverter generating power at a first frequency and power at a second frequency at least;
    an inductive coil coupled to the inverter;
    a generator for generating a compensation signal with power in the second frequency at least;
    means for coupling the compensation signal into the inductive coil;
    a power detector for detecting power at the second frequency at least;
    means for coupling a proportion of the signal in the coil to the power detector;
    means for adapting the amplitude and phase of the compensation signal to minimise the power at the power detector.

This aspect has the advantage that spurious signals generated by the inverter may be cancelled so that they are not coupled to the coil and radiated causing interference.

In addition to the second frequency there may be third frequency or a plurality of frequencies and the amplitude and phase of the frequencies may be adjusted independently.

The inverter may be a half-bridge or full bridge circuit, such that when isolated from the coil, the signal would be substantially rectangular.

The coil may be driven at resonance and/or a filter may be used.

The compensation signal may be derived from the fundamental frequency.

According to a fourth aspect of the invention there is provided a method for transmitting power wirelessly by electromagnetic induction comprising:
    generating power at a first frequency and power at a second frequency at least;
    coupling the power into an inductive coil;

generating a compensation signal with power in the second frequency at least;

coupling the compensation signal into the inductive coil;

detecting power in the coil at the second frequency at least;

adapting the amplitude and phase of the compensation signal to minimise the power at the power detector.

According to a fifth aspect of the invention there is provided a system for transmitting power wirelessly by electromagnetic induction from a primary unit to a secondary unit separable from the primary unit comprising:

a primary unit comprising an inverter generating power at a first frequency and power at a second frequency at least;

a primary coil coupled to the inverter;

a generator for generating a compensation signal with power in the second frequency at least;

means for coupling the compensation signal into the primary coil;

a power detector for detecting power at the second frequency at least;

means for coupling a proportion of the signal in the primary coil to the power detector;

means for adapting the amplitude and phase of the compensation signal to minimise the power at the power detector; and a secondary unit comprising:

a secondary coil;

a rectification unit for rectifying AC power present on the secondary coil to produce DC power;

wherein power is transferred wirelessly from the primary unit to the secondary unit at the first frequency and the second frequency is minimised such that the amount of power radiated by the primary coil and/or secondary coil at the second frequency is minimised.

According to a sixth aspect of the invention there is provided apparatus for transmitting power wirelessly by electromagnetic induction comprising:

an inverter generating power at a first frequency and power at a second frequency at least;

a first coil coupled to the inverter;

a generator for generating a compensation signal with power in the second frequency at least;

a second coil in proximity to the first coil;

means for coupling the compensation signal into the second coil;

a third coil separated from the first and second coils;

a power detector coupled to the third coil for detecting power at the second frequency at least;

means for adapting the amplitude and phase of the compensation signal to minimise the power at the power detector;

The second coil may be in the same orientation as the first coil.

The third coil may be shielded from external radio signals, but not radiated signals from the first coil.

According to a seventh aspect of the invention there is provided apparatus for transmitting power wirelessly by electromagnetic induction comprising:

a driver circuit for generating a substantially rectangular waveform when in isolation by switching between two voltage levels;

a first signal source coupled to the driver input;

an inductive coil coupled to the driver output;

a compensation signal comprising frequencies in the first signal source and/or harmonics of the first signal source;

means for coupling the compensation signal into the inductive coil;

a power detector coupled to the inductive coil;

means for adapting the amplitude and phase of the compensation signal to minimise the power at the power detector outside of a predetermined frequency band.

This aspect has the advantage that an inexpensive and efficient driver circuit can be used and the spurious tones generated by such a driver circuit can be reduced.

The driver may be a half-bridge and or full-bridge circuit.

The first signal source may be a digital signal at a clock rate higher than the fundamental frequency to be transmitted, such that a fundamental with reduced harmonic levels for the low harmonics is generated.

The first signal source may be a rectangular signal at the fundamental frequency to be transmitted.

These and other objects, advantages, and features of the invention will be more fully understood and appreciated by reference to the Description of the Preferred Embodiments and the Drawings.

DESCRIPTION OF THE CURRENT EMBODIMENTS

Figure 11:
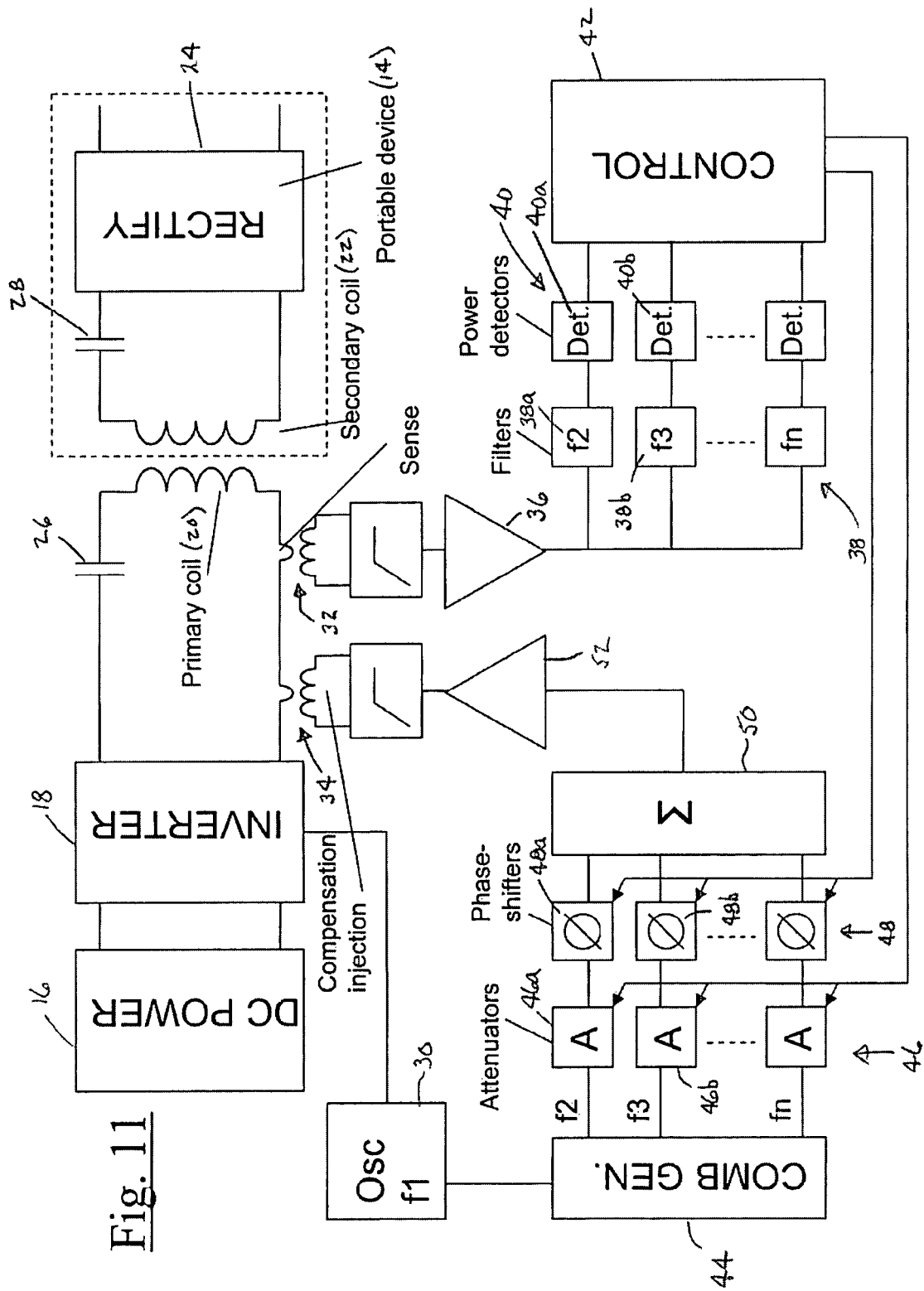
FIG. 11 shows a sixth embodiment of the invention.

FIG. 11 shows what is known as the sixth embodiment of the invention, which is a system for reducing the magnitude of the distortion components present in the primary coil 20. An inverter 18 is used to drive a primary coil 20 with a rectangular signal. The signal may be a square-wave signal or it may be a pulse-width modulated signal in which the duty cycle is varied to vary the amplitude of the signal applied to the primary coil. The inverter 18 is driven by a reference oscillator 30 at frequency f1.

In series with the primary coil 20 is a capacitor 26 such that the combination is resonant at f1 when the secondary load is present. Also in series with the coil 20 is a sense transformer 32 and an injection transformer 34.

The sense transformer 32 typically has one turn on the primary coil side and 20 to 50 turns on the other side in order to present minimal impedance in the primary coil circuit. The sense transformer 32 is used to measure the harmonic distortion present on the primary coil 20. The output is high-pass filtered to remove the fundamental and amplified by the amplifier 36 to make the spurious harmonic tones measurable. The output from the amplifier 36 feeds a bank of narrow-band filters 38, with centre frequencies at f2, f3, . . . fn, where fn is the nth harmonic of f1. The output of each filter 38 is detected with a power detector 40 and fed into a control circuit 42.

The reference oscillator 30 is also the input to a comb generator 44, which generates a series of discrete sinusoidal tones at harmonics at f2, f3, . . . fn. It is actually possible to omit the comb generator 44, and rely on the fact that a square-wave naturally has odd harmonics present. However, it is advantageous to use the comb generator 44 because, unless the inverter has perfect matching, additional even harmonics may appear which are not present on the square-wave input. Another advantage of using a comb generator 44 is that the harmonic frequencies will be of a higher amplitude, affording a higher signal-to-noise ratio. Each tone passes through a separate attenuator 46 and phase shifter 48, and then all the tones are summed through the summer 50 onto a single line. This signal is amplified by the amplifier 52 and then applied to the injection transformer 34. A high-pass filter between the injection transformer and the amplifier ensures that the fundamental does not damage the output stage of the amplifier 52. The injection transformer 34 has a single turn on the primary coil side and 20 to 50 turns on the other side. This enables a low-level compensation signal to be injected without disturbing the high power delivered by the inverter 18 to the primary coil 20. As the turns ratio of the injection transformer 34 will attenuate the injected signal, a higher signal is required. However this signal should still be within the range afforded by conventional linear op-amp devices, because the spurious tones are so low.

All the attenuators and phase shifters are controlled by the control unit 42 which may be a microprocessor, an application specific integrated circuit (ASIC), or a field programmable gate array (FPGA). The control unit 42 adjusts the attenuator 46 and the phase-shifter 44 for each harmonic tone, to minimise the power at that tone as measured by the sense transformer 32. Due to the resonance and also harmonics generated by the rectifier 24, the uncompensated system will have harmonics of different amplitude and phase to that predicted by the rectangular input signal. However, the feedback will still act to minimise the power in each harmonic. The feedback will automatically compensate for any gain variation and phase delay present in the feedback path. The feedback will also compensate for component tolerance variation. The feedback will also compensate for time-varying effects, such as temperature variation in components, drift in the reference oscillator, changes in the amplitude of the delivered power and changes in the device load (which could alter the harmonic distortion of the rectifier). If the system is substantially linear, then it is possible to optimise the magnitude and phase of each harmonic tone independently. That is, to minimise the power in the third harmonic f3, the attenuator 46b and phase shifter 48b are adjusted to minimise the power seen at detector 40b.

Figure 7:
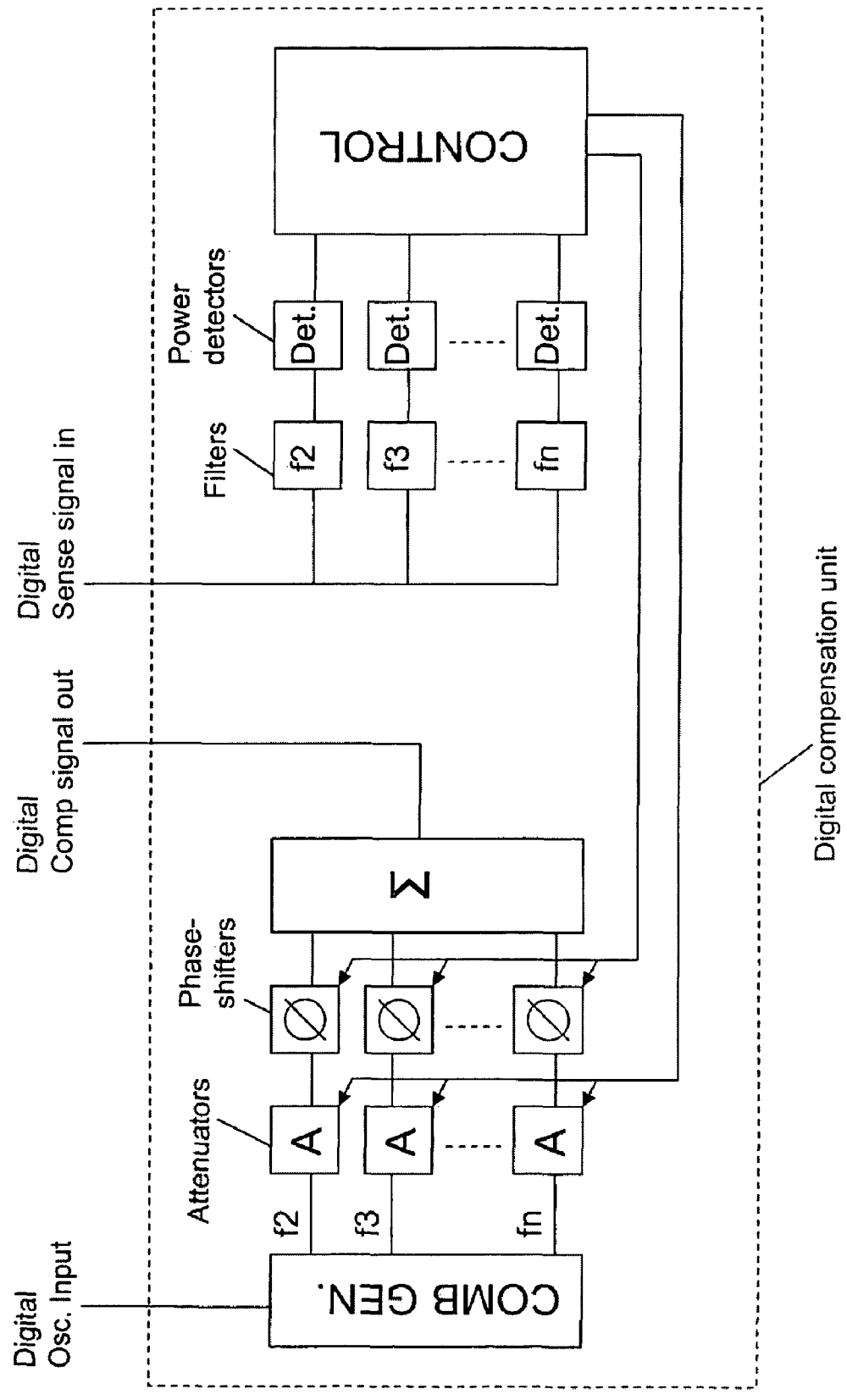
FIG. 7 shows a second embodiment of the invention.

The FIG. 11 embodiment is an analogue implementation of the FIG. 5 embodiment described below. A digital embodiment similar to the FIG. 11 embodiment is shown in FIG. 7 discussed below.

Figure 1:
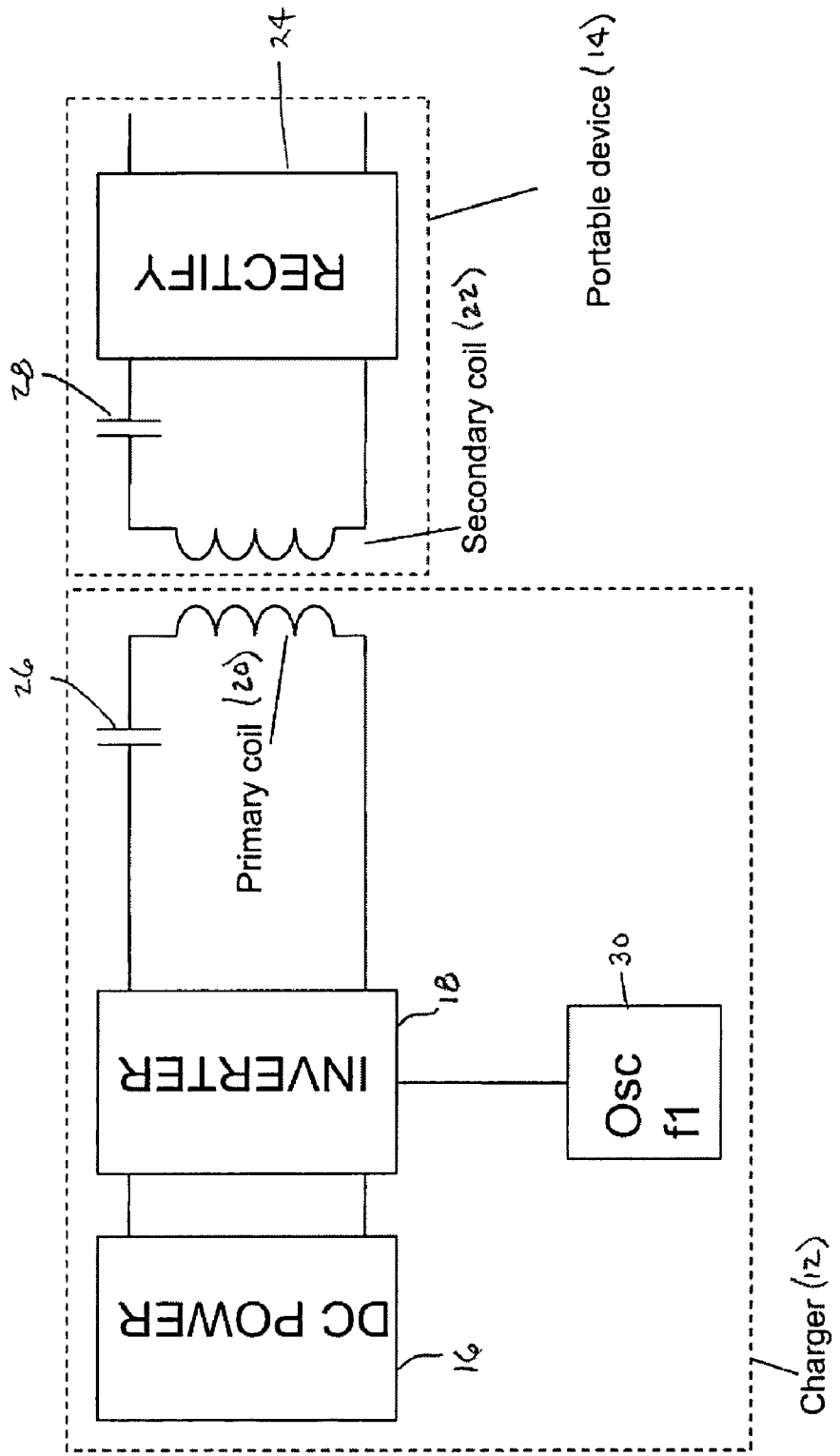
FIG. 1 shows a prior art system.
Figure 2:
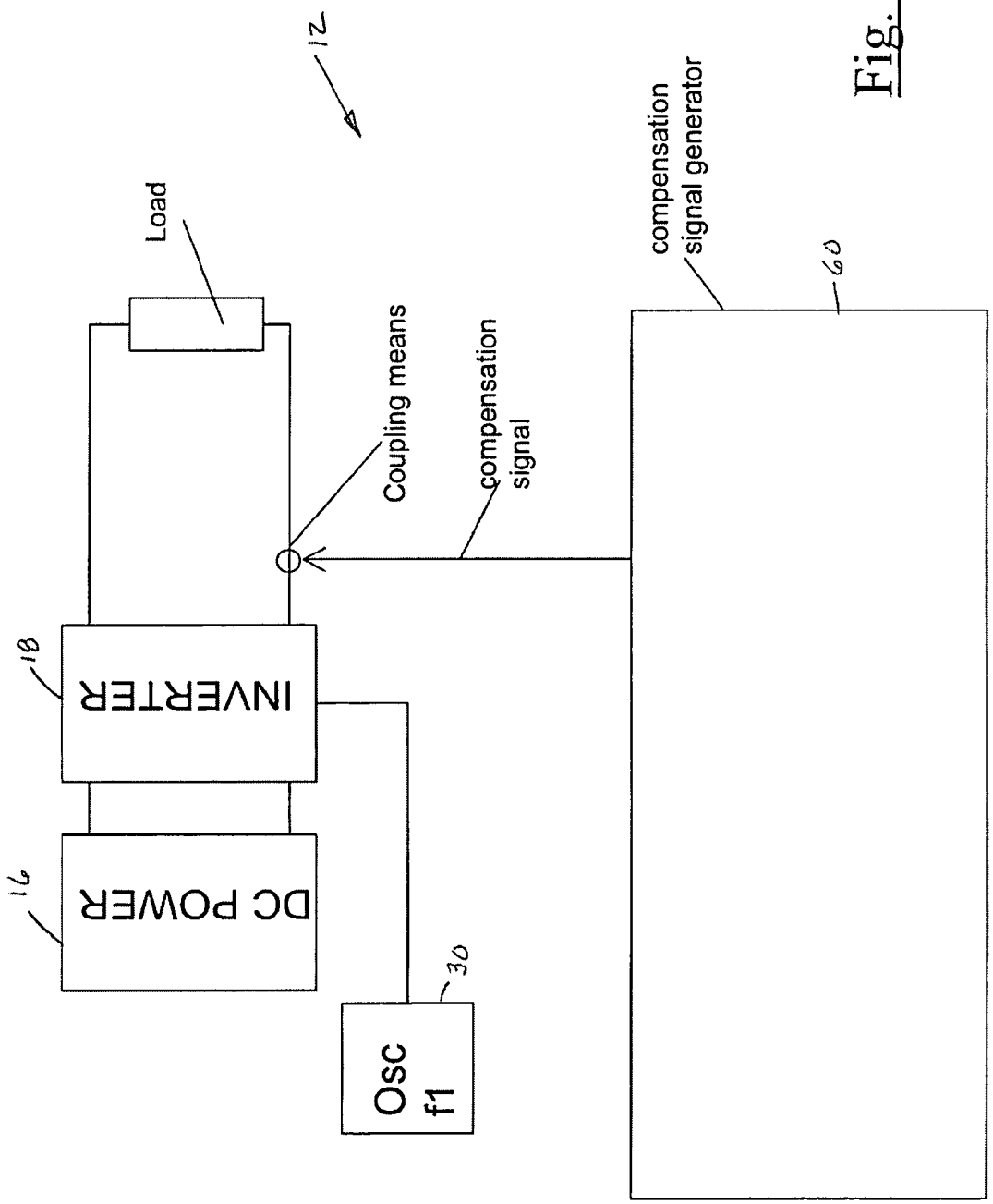
FIG. 2 shows an open-loop control implementation.

FIG. 2 shows the charger 12 and the compensation signal generator for the most basic implementation of the invention. Although the present system has some similarity in concept to audio cancellation, the present system is deterministic. The approach is to generate a pure tone, but at high current and/or voltage. It is difficult and/or expensive to use a linear amplifier. Instead this embodiment uses an inverter 18. However a consequence is that the inverter 18 produces spurious tones (e.g. harmonics). If a harmonic is in the frequency range of an unrelated device such as an AM radio, the harmonic can create significant interference with the unrelated device. Consequently, a compensation signal generator (CSG) 60 is included to inject a low-level signal to cancel the harmonics. Because the spurious tones are low, a conventional linear amplifier can be used to drive this signal. The signals can be digital, analogue or a combination of digital and analogue (i.e. completely general). This embodiment can still be used if there is modulation imposed as will become apparent below.

Figure 3:
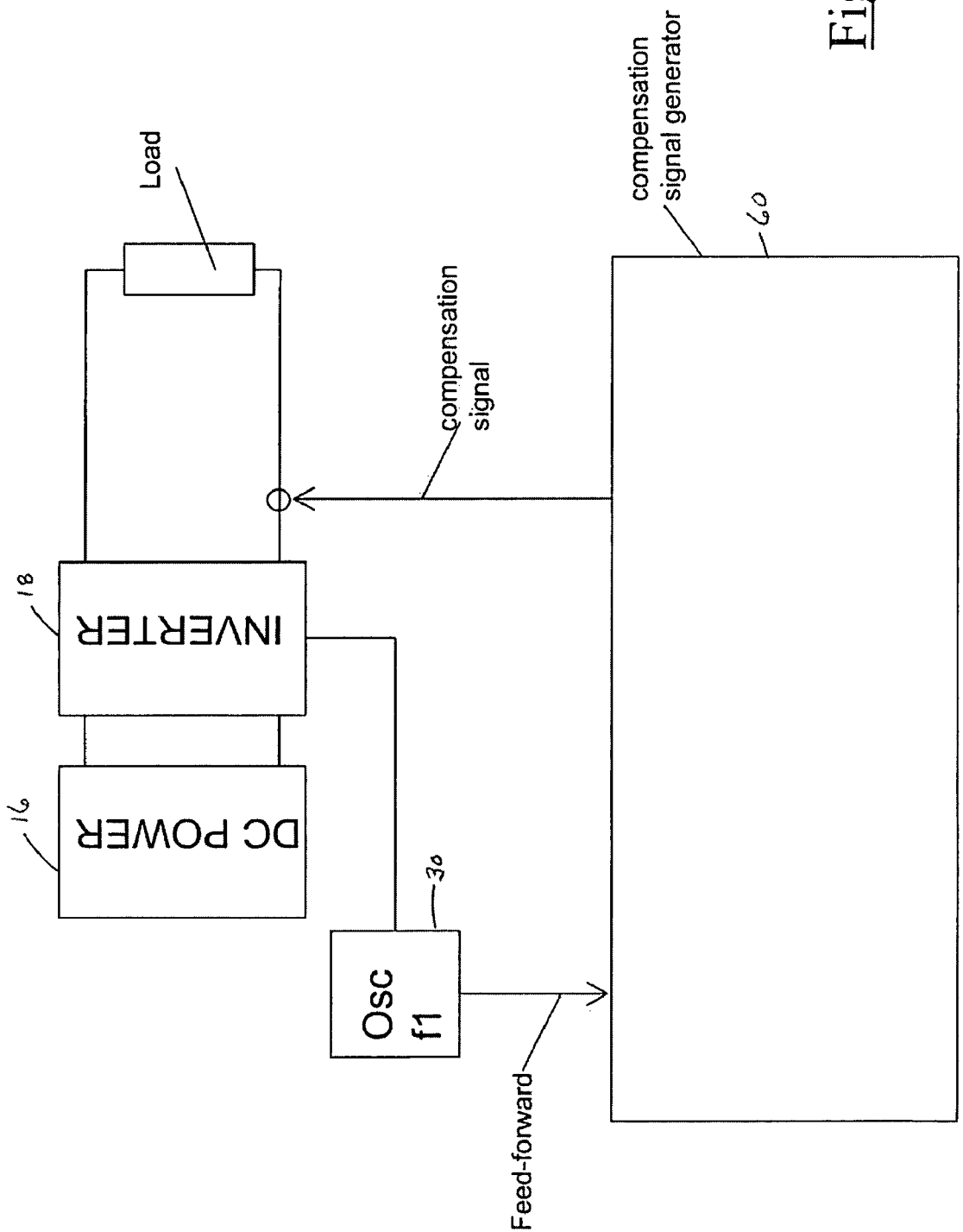
FIG. 3 shows a feed-forward implementation.

FIG. 3 shows a feed-forward implementation. The spurious frequencies are known, because they are harmonics of the fundamental. We therefore use the oscillator 30 input and the knowledge of the other components in the system to generate the compensating signal without feedback. An issue with this implementation is that what the load circuit is doing to the input signal (by way of modifying the amplitude and phase) must be known with a fair degree of precision. Component tolerances, such as temperature variation and manufacturing tolerance, add uncertainty to this. The shown load is generic, although typically the load includes an inductor and a capacitor.

Figure 4:
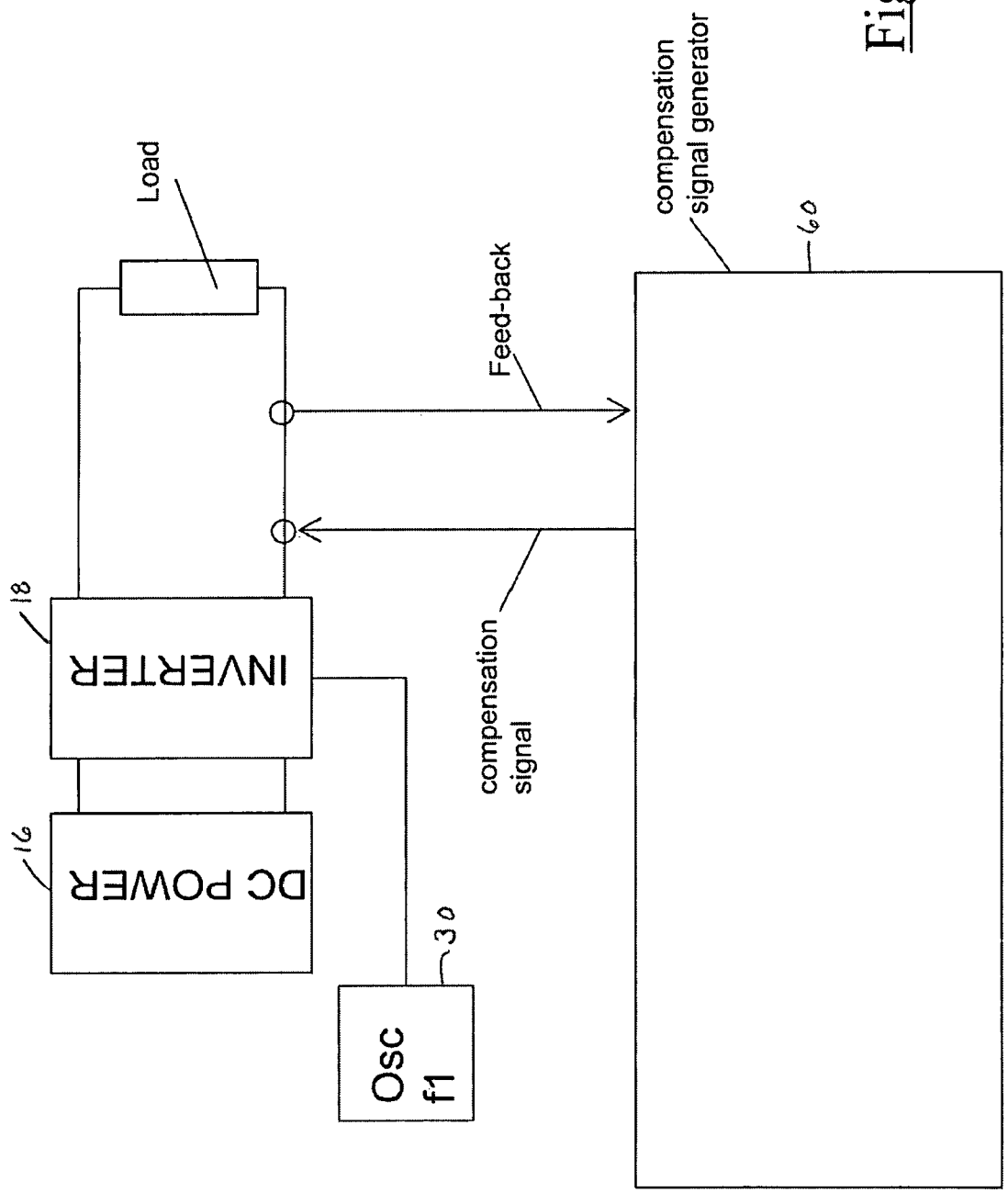
FIG. 4 shows a feedback implementation.

FIG. 4 shows a feedback implementation. The signal that is being applied to the load is sensed. We then use this as feedback to generate the compensating signal. This implementation has one potential drawback. Ideally, when the compensating signal is properly configured, there is a pure tone at the load, and therefore no harmonics present. There is therefore no spurious signal present for use as the input to the CSG 60, so that perfect compensation results in an inability to sense variations. It therefore is desirable to separate the injection point from the sense point.

Figure 5:
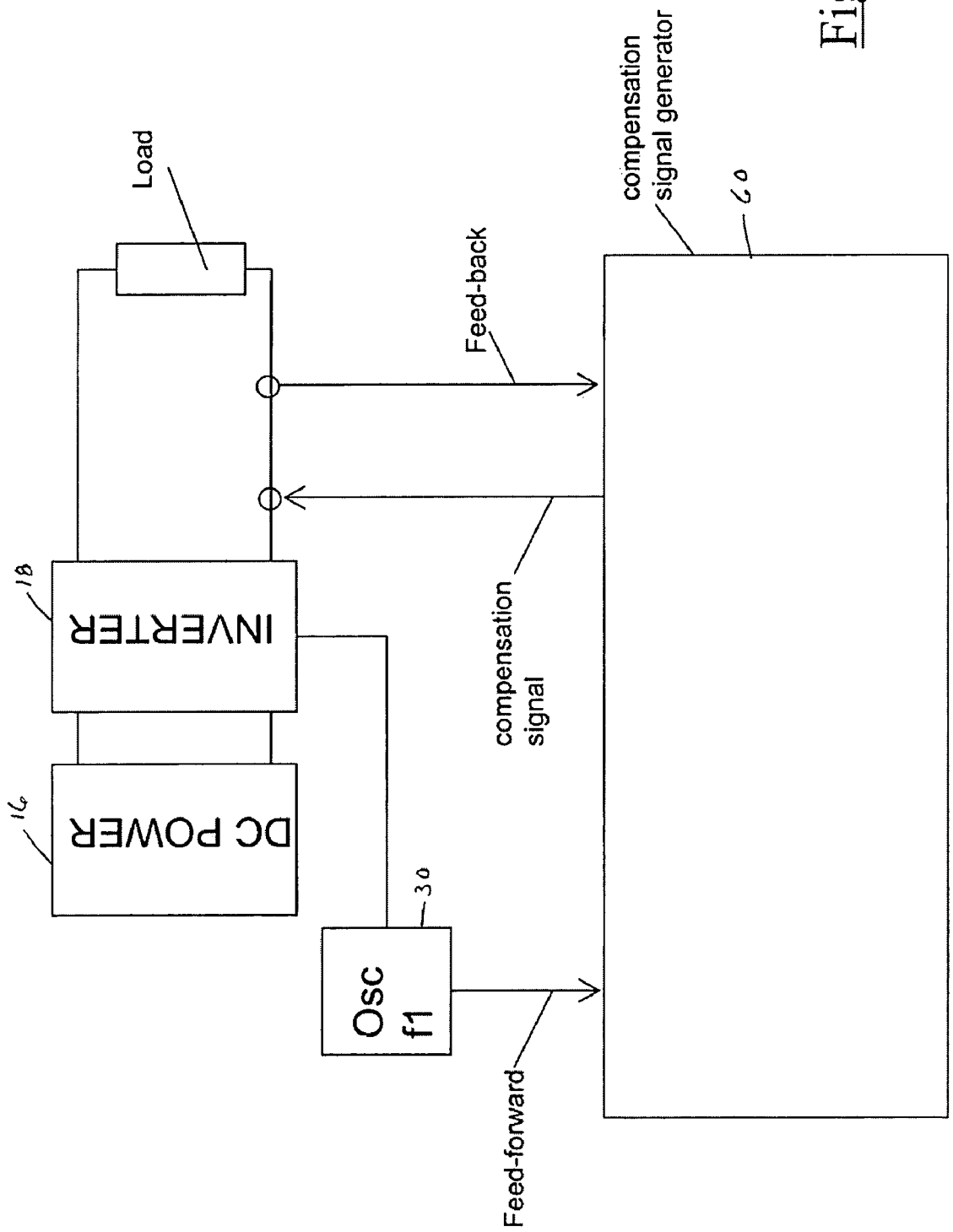
FIG. 5 shows a combined feed-forward/feedback implementation.

FIG. 5 shows a combined feed-forward and feedback implementation which solves the issues identified in conjunction with FIGS. 3 and 4 implementations. The oscillator 30 signal is used to generate the spurious tones. The spurious tones may be generated within the CSG, or they may be present on the oscillator signal. The sense signal is used by the compensation signal generator to modify the spurious tones, such that the sensed signal is a pure tone. Typically, such modification includes the modification of the amplitude and the phase of each harmonic to cancel each undesired frequency. Thus even when the compensating signal is properly configured, there is still an input signal to the compensation unit.

Figure 6:
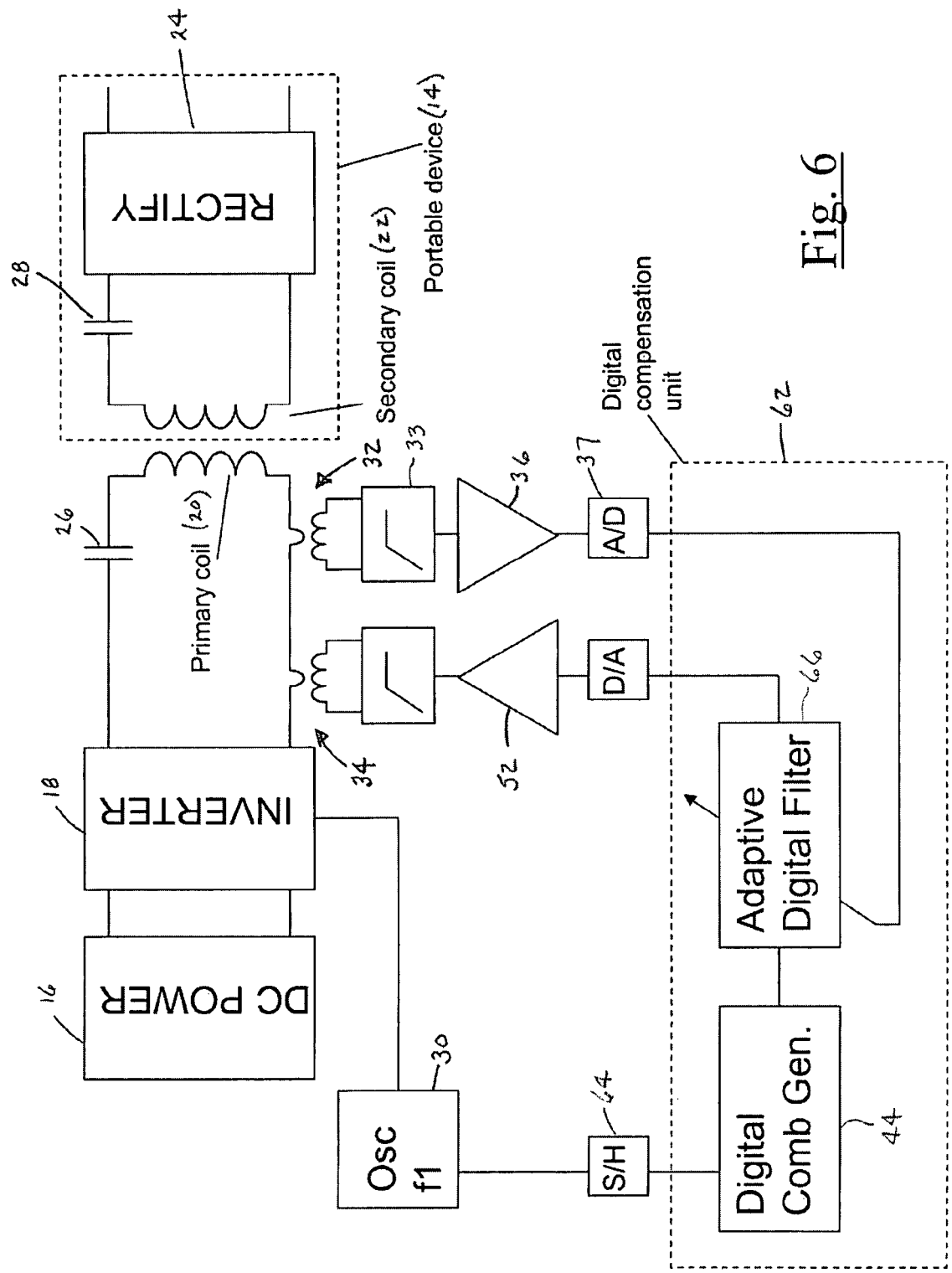
FIG. 6 shows a first embodiment of the invention.

FIG. 6 shows what is known as the first embodiment of the invention—and currently the preferred embodiment—in which the compensation is performed digitally. In this system the main primary and secondary circuits are the same as previously described, and they use the same sense and injection transformers. However, in this arrangement, the compensation signal is generated digitally. A digital compensation circuit (DCC) or unit 62 is used, which is clocked at a higher frequency than f1. For instance, f1 may be at 100 kHz; and the clock frequency of the digital compensation circuit may be 100 MHz. This may be implemented as an ASIC, an FPGA, a microprocessor, or a digital signal processor (DSP). Typically this device can process numbers using fixed point arithmetic, though floating point devices are also available. The DCC 62 takes the reference oscillator 30 as an input. This is sampled with a sample and hold amplifier 64 and used to generate the discrete tones digitally. There are many algorithms for generating periodic signals digitally, for example direct synthesis using a digital phase-locked loop. The signals may be summed by simply adding them together to produce a single signal. The resulting signal is a series of numbers clocked at the clock rate of the DCC 62. This signal passes through an adaptive digital filter (ADF) 66.

The ADF 66 is a tapped delay line filter and consists of n previous inputs weighted and summed to produce a finite impulse response (FIR) filter. Additionally m previous outputs may also be weighted and summed to produce an infinite impulse response (IIR) filter. The ADF 66 weights (or taps) are dynamically varied to change the amplitude and phase response of the filter. In this way it is possible to arbitrarily alter the amplitude and phase of each harmonic component from the digital comb generator 44 to cancel the harmonics in the primary coil. The output of the ADF 66 is converted to an analogue signal with a digital-to-analogue converter and directed to the injection transformer 34.

The signal from the sense transformer 32 passes through a high-pass filter 33 to remove the fundamental. This is in turn amplified by an amplifier 36 and converted to a digital signal with an analogue-to-digital converter 37. This signal is fed into the ADF 66 as a control signal. Optionally a wide bandwidth power detector may be placed between the amplifier 36 and the analogue-to-digital converter 37, such that the control signal is converted to a power level before entering the DCC 62. The weights of the ADF 66 are dynamically adjusted to minimise the power of this control signal. There are many algorithms that can be used to adjust the weights of an ADF to minimise a control signal, including the Least Means Squares and Recursive Least Squares algorithms. These can be implemented digitally within the DCC 62.

FIG. 7 what is known as the second embodiment of the invention. This embodiment is a digital implementation of the FIG. 6 embodiment. Instead of using a tapped delay line filter, each harmonic is sensed individually. If the system is linear, then each harmonic can be adjusted individually. It should therefore be simpler to adjust the system to nullify each harmonic. The FIG. 7 embodiment works well when the system is linear. The FIG. 6 embodiment likely works better when the system is nonlinear because the harmonics are interrelated.

Figure 8:
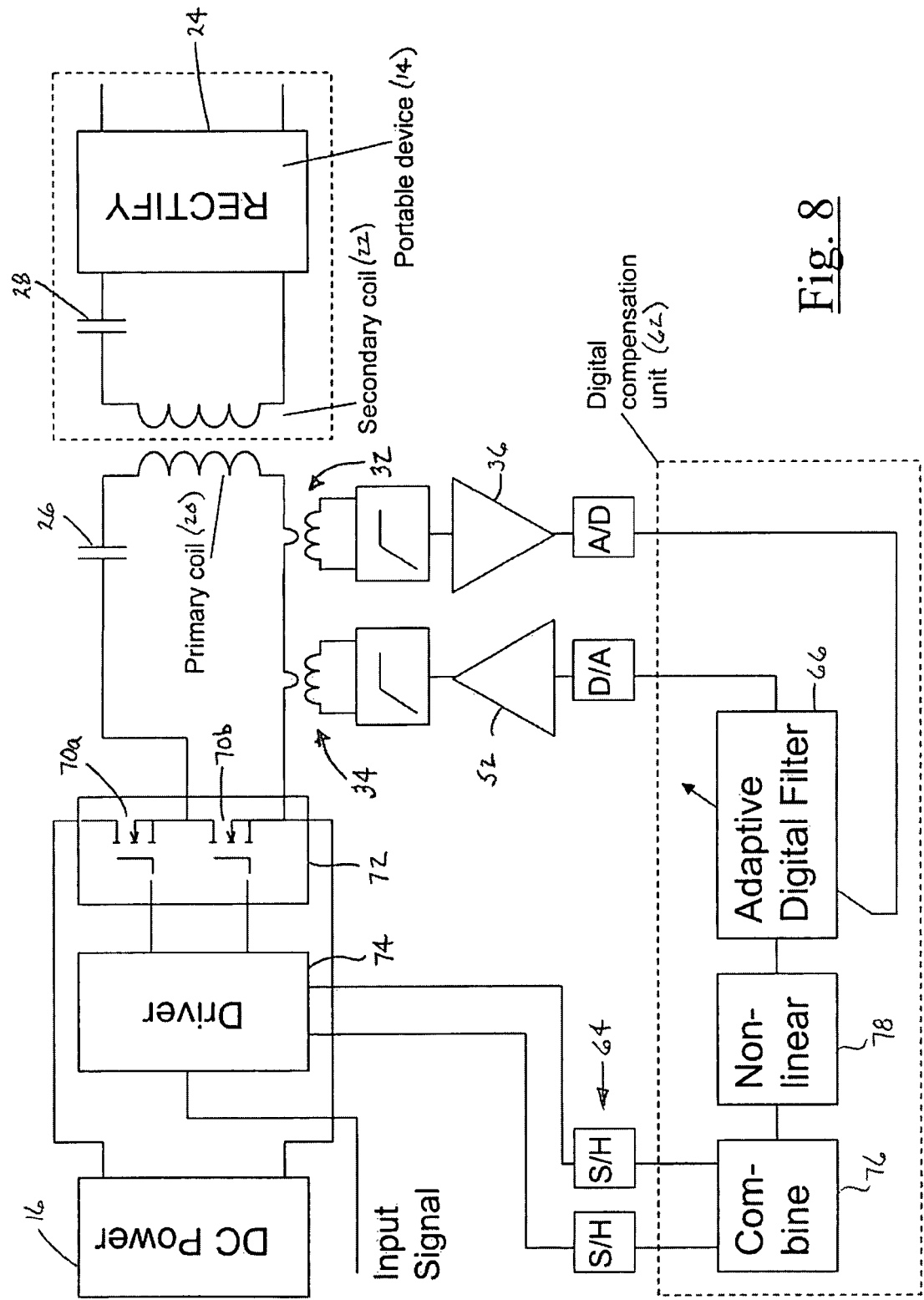
FIG. 8 shows a third embodiment of the invention.

FIG. 8 shows what is known as the third embodiment in which a more complicated signal is applied to the primary coil 20. This embodiment recognises that the oscillator signal is not the same as the signal being applied to the driver 74. In order to reduce the harmonic content of the signal applied to the primary coil 20, the power transistors 70a, 70b in the half-bridge circuit 72 can be switched at a higher frequency than f1. One method of achieving this is to use a class D amplifier approach in which a comparator is fed with the fundamental frequency at f1 and a much higher frequency triangle wave in order to generate the pulse-width modulated signal. This system does generate harmonics of the switching frequency, but because this is way above the fundamental they are greatly attenuated by the resonant circuit. Another approach is to use a so-called "Magic Sine Wave" approach in which known combinations of 1's and 0's at the switching frequency are used to generate spectrally pure signals at the fundamental frequency at different amplitude levels. (See Don Lancaster's Guru's Lair—Magic Sine Waves, www.ti-naja.com/magsn01.asp.)

Rather than simply look for harmonics of the fundamental frequency, the approach is to look at the exact signals applied to the half-bridge 72. In this system, the fundamental frequency is applied as an input signal to a driver 74, which generates the signals for the half-bridge 72. The driver 74 also has as outputs digital equivalents of these signals, which are passed to the DCC 62 through the sample-and-hold devices 64. The DCC 62 uses this information to reconstruct the signal that would be generated by the half-bridge 72 in isolation. The signals are combined 76, and the combined signal then passes through a nonlinear function 78 to account for harmonics generated by the rectifier 24. Optionally, the nonlinear function may have feedback from the sense transformer 32. The signal then passes through the ADF 66 as described above and is injected into the primary coil 20 with the injection transformer 34. The feedback for the ADF 66 is provided by the sense transformer 32.

Figure 9:
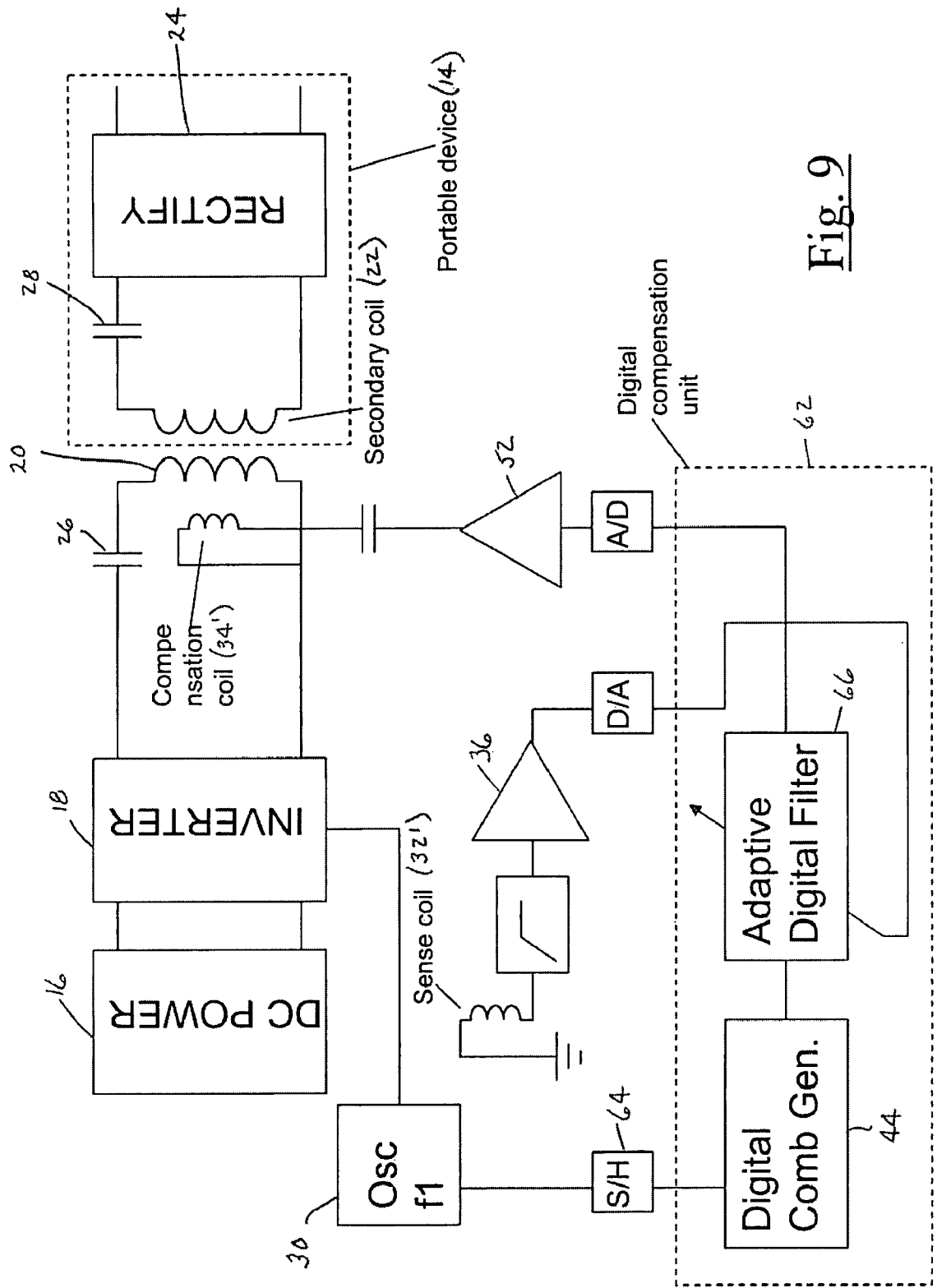
FIG. 9 shows a fourth embodiment of the invention.

FIG. 9 shows what is known as the fourth embodiment in which the harmonic distortion is compensated for using a separate coil, rather than injecting the signal into the primary circuit. In this embodiment, a compensation coil 34' is placed in close proximity to the primary coil 20, and in the same orientation, but far enough away such that there is only minimal coupling between the two. The compensation signal is applied to this compensation coil 34', so that in the far field, well away from the unit, all the spurious tones are cancelled. In order for this system to function, a sense coil 32' is required to detect the distorted signal in the far field. However, it is preferable that this sense coil 32' is far enough away from the primary coil to be in the far field, but also shielded (e.g. by a metal shield) from external radio transmissions, to prevent the device from jamming them. The sense coil 32' is used to control the ADF 62, and the output of the ADF is applied to the compensation coil 34'. One advantage of using a separate coil rather than a transformer in the primary circuit, is that it is easier to make a separate coil resonant at a different frequency to the fundamental (for instance at the strongest harmonic). Preferably, the sense coil is shielded to prevent inadvertent jamming of an unrelated device such as an AM radio.

Figure 10:
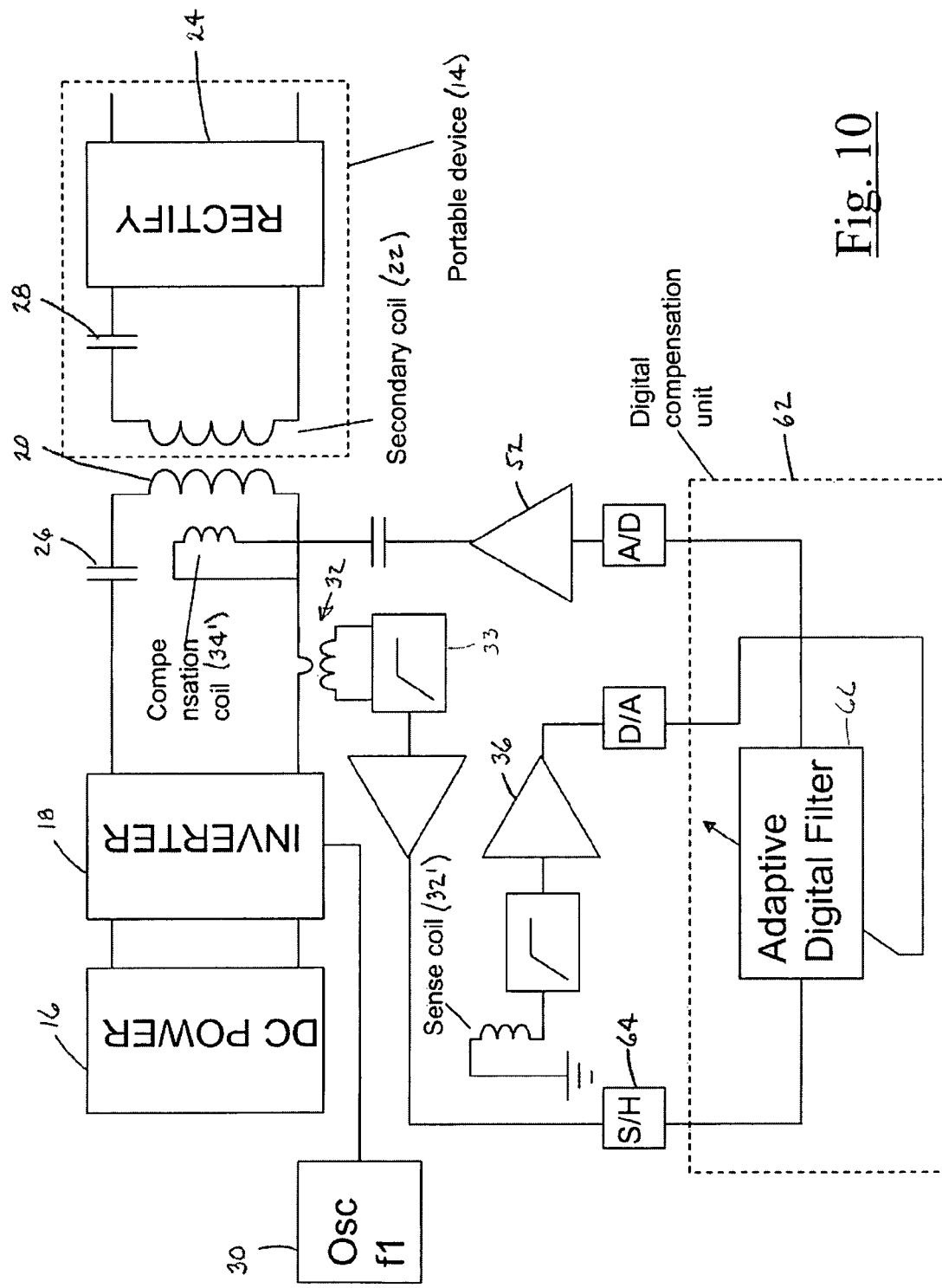
FIG. 10 shows a fifth embodiment of the invention.

FIG. 10 shows what is known as the fifth embodiment shows in which a sense coil 32' and a compensation coil 34' are again used, but also having a sense transformer 32. Because this embodiment does not directly attenuate (or eliminate) the distortion in the primary coil 20, the signal from the sense transformer 32 can be used as the source for spurious signal components as input to the ADF 66. The signal from the sense transformer 32 passes through a high-pass filter 33 to remove the fundamental, and the output is applied to the ADF 66. The sense coil 32' is used to control the ADF 66. The ADF 66 is adjusted such that the power detected by the sense coil 32' is minimised. The output of the ADF 66 is applied to the compensation coil 34'.

There is separation between where the compensation signal is injected and where the spurious tones are taken from in order to generate the compensation signal. However, because the compensation coil 34' is not coupled to the primary coil 20, the spurious tones will still be present on the actual load. It therefore is possible to detect these spurious tones and use them as input to the CSG.

Figure 14:
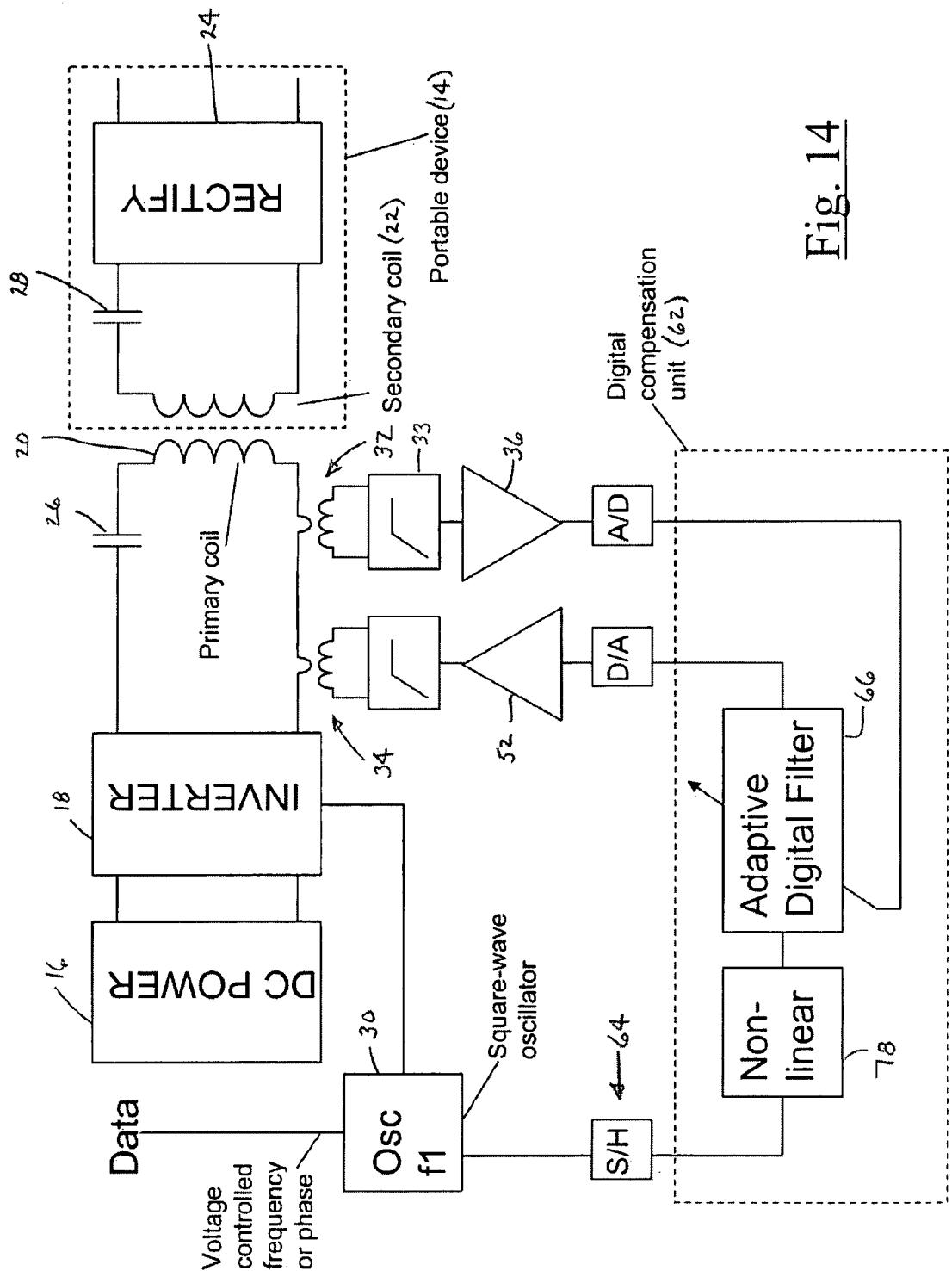
FIG. 14 shows a seventh embodiment of the invention.
Figure 16:
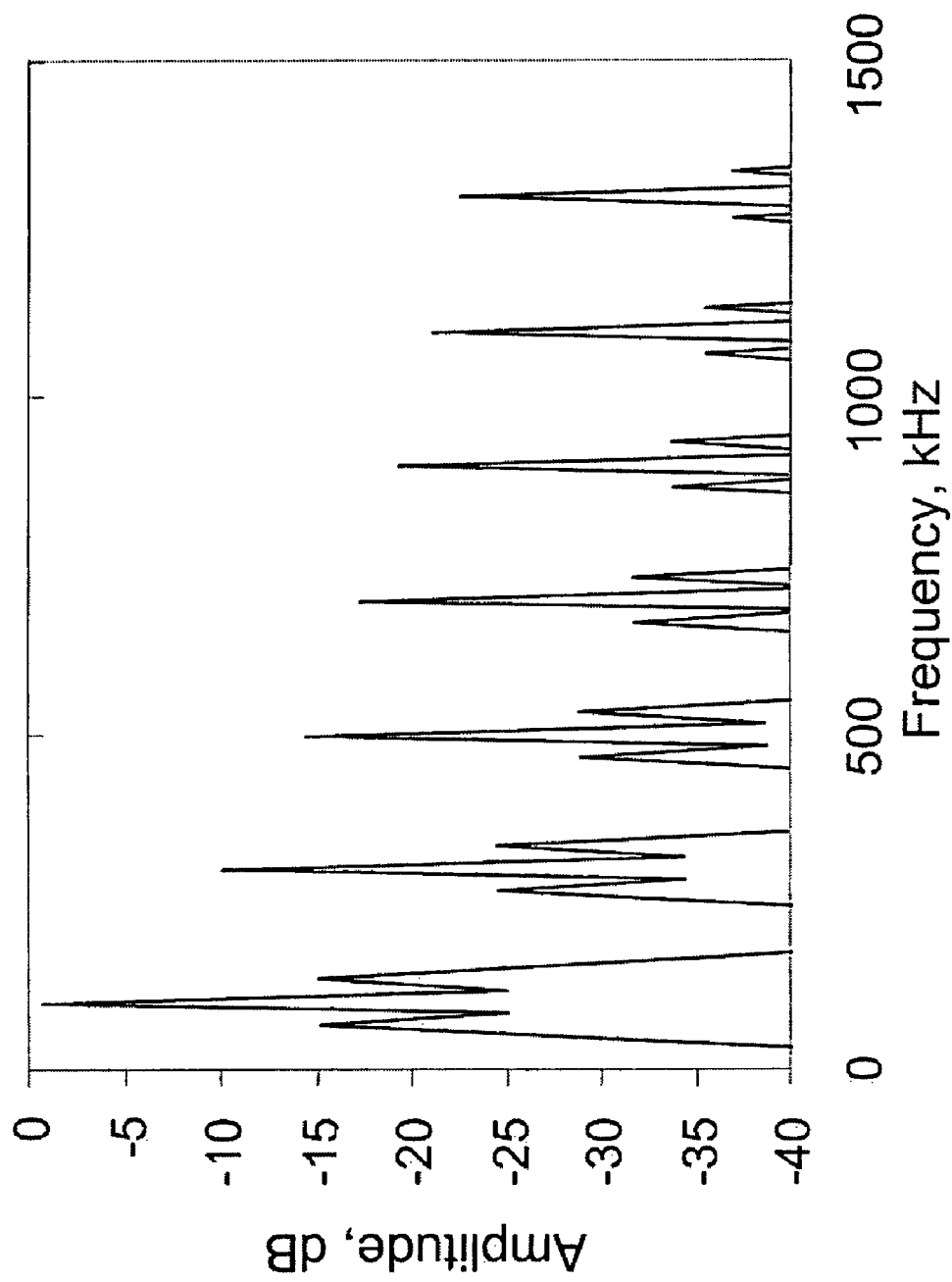
FIG. 16 shows the modulated oscillator signal associated with the FIG. 14 embodiment, including the fundamental, the higher harmonics, and modulation sidebands.

FIG. 14 shows what is known as the seventh embodiment in which a circuit with modulation is applied to the oscillator 30 directly. This embodiment can be used for either 1) frequency modulation or 2) phase modulation. The modulation is applied to the oscillator directly. This modulation means that instead of the fundamental and higher harmonics being pure tones, they have modulation sidebands, for example as illustrated in FIG. 16. These harmonics with sidebands can be cancelled in much the same way. The modulated oscillator signal is fed into the DCC 62. Instead of a comb generator (which would generate discrete pure tones), a nonlinear element 78 is used to generate (or increase the level of) the harmonic tones. The nonlinear element may be omitted. This signal is fed into the ADF 62. The output of the ADF 62 is fed into the injection transformer 34. The ADF 62 is optimised by minimising the power detected by the sense transformer 32 together with its low-pass filter 33.

Figure 15:
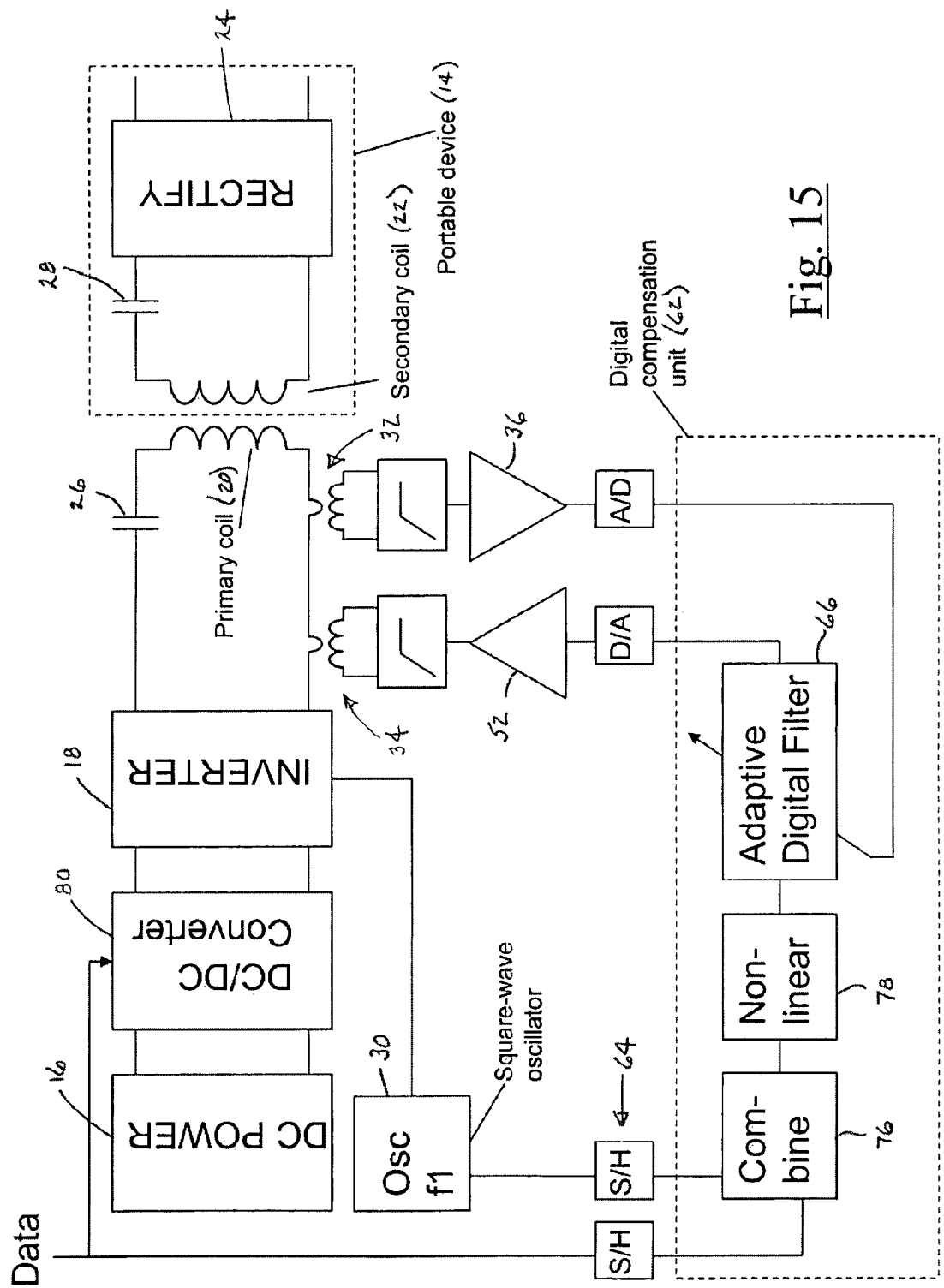
FIG. 15 shows an eighth embodiment of the invention.

FIG. 15 shows what is known as the eighth embodiment providing a circuit with amplitude modulation. This modulation cannot be put on the oscillator 30. Instead the input to the inverter 18 is varied in amplitude using a DC/DC converter (e.g. a Buck converter or a down converter) 80. The duty-cycle of the DC/DC converter 80 is modulated. This results in the signal being applied to the coil 20 also being amplitude modulated. Consequently, a modulated signal needs to be reconstructed digitally in the compensation unit 62. The modulation signal and the oscillator signal are appropriately combined digitally in the DCC 62 to generate the sidebands around the fundamental and higher harmonics. See FIG. 16. This signal may also pass through a nonlinear element 78 to increase the level of the higher harmonics (with sidebands), or the nonlinear element may be omitted. The ADF 66 is optimised as described above.

Figure 17:
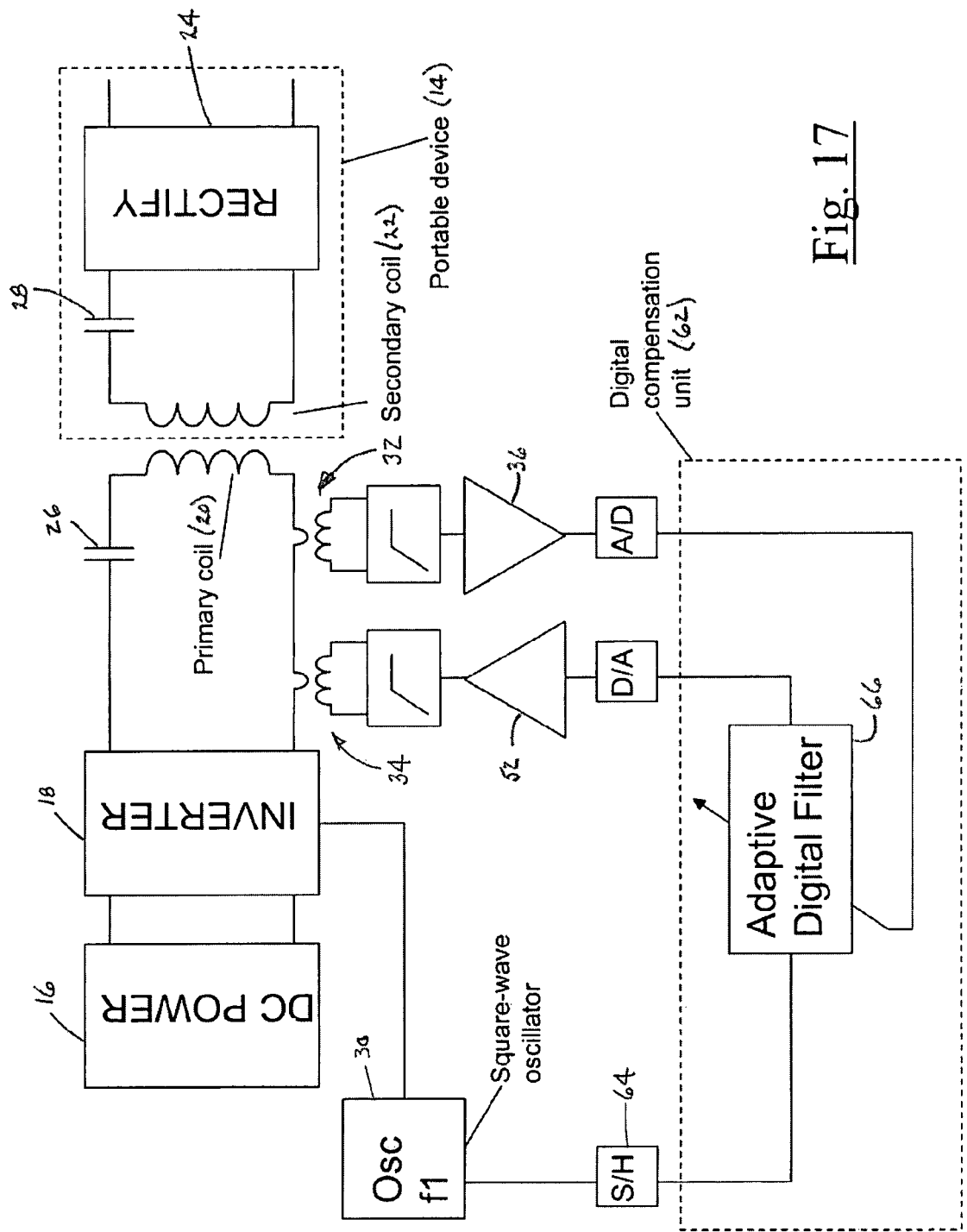
FIG. 17 shows a ninth embodiment of the invention.

FIG. 17 is what is known as the ninth embodiment, which is similar to the embodiment shown in FIG. 6 except that the digital comb generator in FIG. 6 is omitted. This ninth embodiment shows that it is not strictly necessary to use a comb generator to generate the harmonics for the compensation signal. A square wave has harmonics naturally. However, possibly a better signal-to-noise ratio is achievable if a digital comb generator is used. The comb generator, if present, also allows even harmonics to be compensated.

There are many other combinations of the described embodiments that can be used in order to gain advantage. For instance, there are other combinations of analogue and digital implementation, other combinations of using sense coils and sense transformers or compensation coils and injection transformers.

Instead of using separate transformers to couple the signals in and out, a single transformer may be used. It may not be necessary to use low-pass filters on these transformers.

Instead of using transformers to couple the signals in and out, the signals may be coupled in and/or out by adding additional turns onto the primary coil.

It may be desirable to make the sense and/or injection transformers resonant at one particular harmonic other than the fundamental. It may be desirable to make the sense coil and/or compensation coil resonant.

It may be possible to use the compensation coil for compensation of the fundamental in the far field as well as the harmonics.

There may be other means for coupling the signals in and out of the primary coil, such as without limitation capacitive, resistive, or coupled transmission line couplers.

Additional elements may be present, other than those illustrated, for instance a power filter (such as an LC low-pass filter) may be present after the inverter.

Instead of deriving a comb of frequencies from the reference at the fundamental frequency, the reference oscillator may be at a higher frequency harmonic and the other frequencies (including the fundamental) are derived by dividing down from this reference frequency.

Instead of using series resonance, parallel resonance, no resonance, or combinations thereof on the primary and the secondary may be made.

Instead of a half-bridge rectifier, a full bridge rectifier may be used.

Although this system has considered single primary and secondary coils, it may also be applied to systems with single primary, multiple secondary; multiple primary, single secondary; and multiple primary, multiple secondary systems.

Although this invention is disclosed in the context of wireless power transfer systems, it may also be applied to any system in which it is necessary to deliver power into a load. This includes without limitation inductive, capacitive, and resistive loads and combinations thereof.

Figure 12:
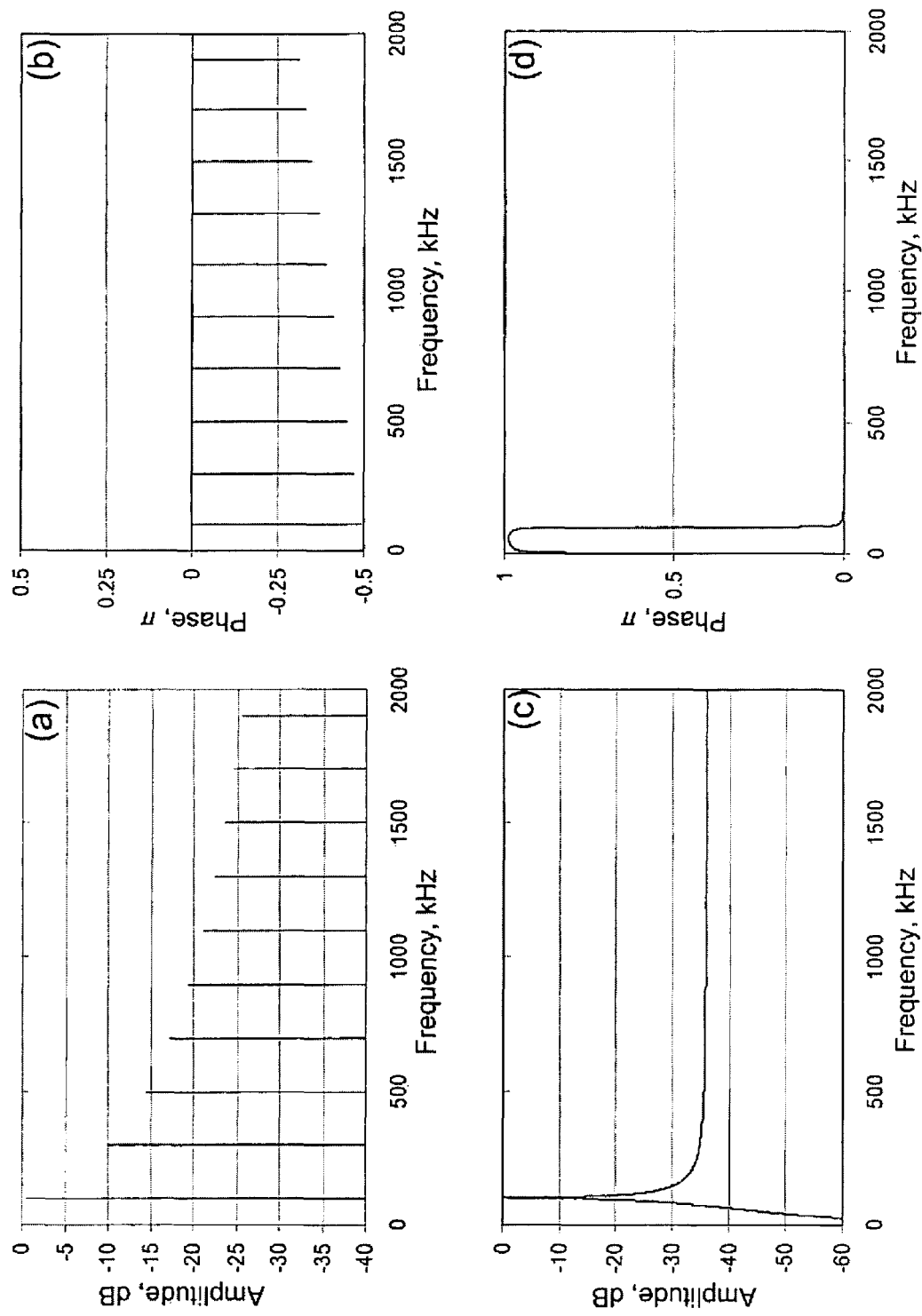
FIGS. 12 and 13 show sample signals associated with selected embodiments of the invention.
Figure 13:
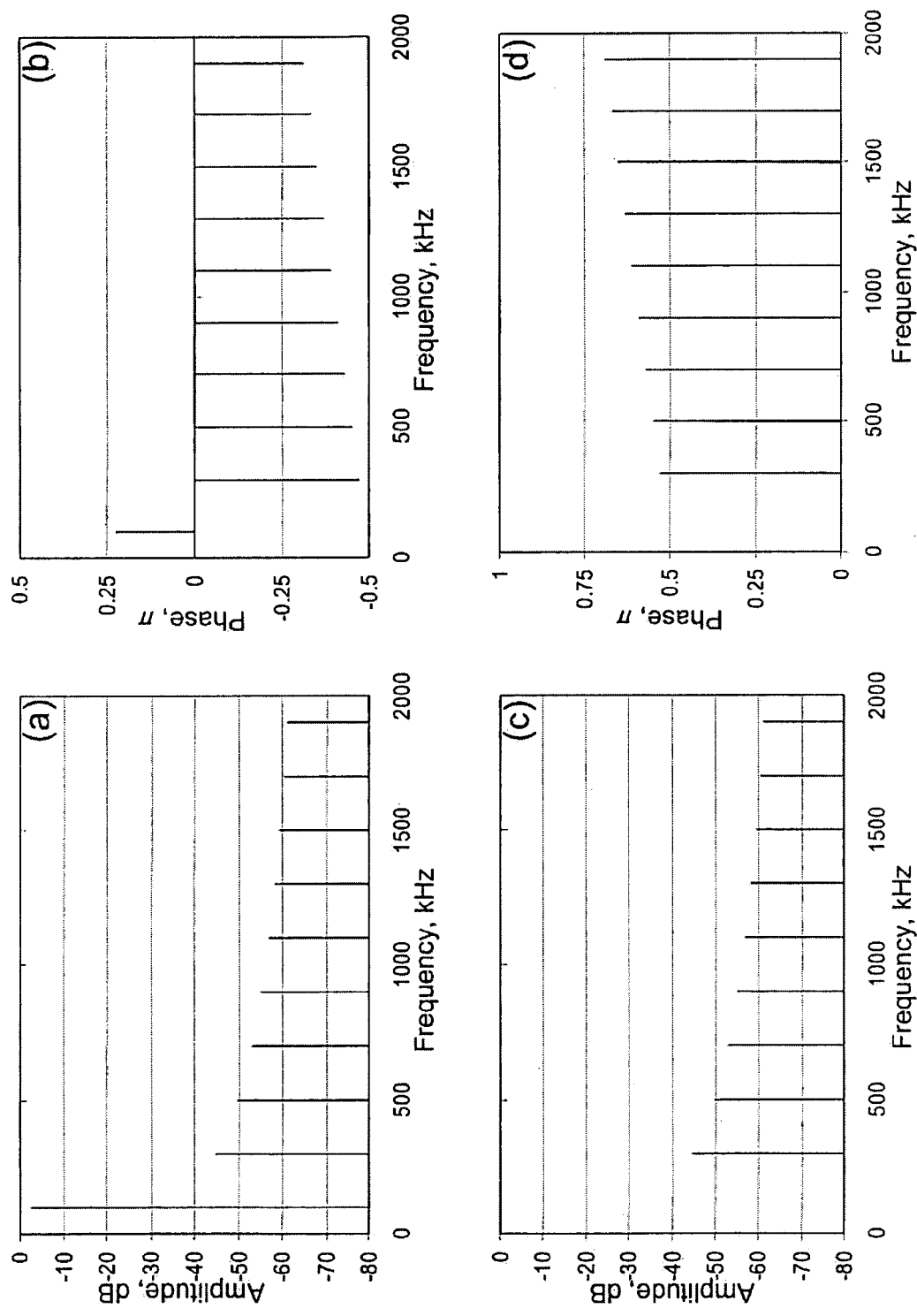

FIGS. 12-13 and 16 show sample signals associated with the present invention. These sample signals apply to the circuits shown in FIGS. 5-6, 8, 11, and 17.

FIG. 12(*a*) shows the amplitude of the square-wave signal from the inverter 30. FIG. 12(*b*) shows the phase of the square-wave signal from the inverter 30 FIG. 12(*c*) shows the amplitude response of the series LC circuit (i.e. the voltage across the primary coil 20 in response to a voltage across the series combination of the primary coil 20 and the capacitor 26). FIG. 12(*d*) shows the phase response of the series LC circuit.

FIG. 13(*a*) shows the amplitude of the square wave plus the series LC circuit (i.e. the composite signal seen at coil). FIG. 13(*b*) shows the phase response of the square wave plus the series LC circuit. FIG. 13(*c*) shows the compensation signal amplitude. FIG. 13(*d*) shows the compensation signal phase. The compensation signal has no fundamental. The higher harmonics have the same amplitude as those at the coil, and the phase of the higher harmonics are exactly out-of-phase (i.e. pi phase difference) with those seen at the coil. Consequently, the compensation signal cancels the undesired higher harmonics.

FIG. 16 shows the spectrum when the square wave is modulated. There are sidebands around each harmonic. However, these can be compensated in the same way as described above. However a comb generator cannot be used for such compensation. Rather the actual modulated signal must be used.

The above descriptions are those of current embodiments of the invention. Various alterations and changes can be made without departing from the spirit and broader aspects of the invention as defined in the claims.

The invention claimed is:

1. An apparatus for providing an alternating current (AC) signal with low distortion comprising:
   an inverter producing an output including a first AC signal having a component of power at a first frequency;
   a power detector detecting power in at least one other frequency different from the first frequency;
   means for coupling a proportion of the first signal to the power detector;
   means for generating a compensation signal including at least one of the other frequencies, the compensation signal adapted to minimise the power at the at least one of the other frequencies at the power detector; and
   means for coupling the compensation signal into the inverter output.

2. An apparatus as defined in claim 1 wherein the first signal is a substantially rectangular signal.

3. An apparatus as defined in claim 1 further comprising a reference oscillator adapted to drive the inverter.

4. An apparatus as defined in claim 3 wherein the at least one other frequency is at least one harmonic of the reference oscillator.

5. An apparatus as defined in claim 1 wherein the means for generating a compensation signal includes means for varying at least one of the amplitude and phase of the other frequencies.

6. An apparatus as defined in claim 5 wherein the means for varying includes a digital filter.

7. An apparatus as defined in claim 1 wherein the means for generating includes a processor, preferably a digital signal processor.

8. A method for providing an alternating current (AC) signal with low distortion comprising:
- providing a first signal with at least a component of power at a first AC frequency;
- providing a compensation signal comprising at least one frequency other than the first frequency;
- coupling the compensation signal to the first signal;
- detecting the power in the at least one other frequency in the first signal; and
- adapting the compensation signal to minimise the detected power.

9. A method as defined in claim 8 wherein the first signal is a substantially rectangular signal.

10. A method as defined in claim 8 wherein the first providing step includes using a reference oscillator to drive an inverter.

11. A method as defined in claim 10 wherein the at least one other frequency is at least one harmonic of the reference oscillator.

12. A method as defined in claim 8 wherein the adapting step includes varying at least one of the amplitude and the phase of the other frequencies.

13. A method as defined in claim 12 wherein the adapting step includes using a digital filter.

14. A method as defined in claim 8 wherein the second providing step includes using a processor, preferably a digital signal processor.

15. An apparatus for transmitting power wirelessly by electromagnetic induction comprising:
- an inverter generating power at a first frequency and power at a second frequency;
- an inductive coil coupled to the inverter, whereby a first signal is created in the coil;
- a power detector for detecting power at the second frequency;
- means for coupling a proportion of the first signal in the coil to the power detector;
- a compensation signal generator for generating a compensation signal with power in the second frequency;
- means for coupling the compensation signal into the inductive coil; and
- means for adapting at least one of the amplitude and the phase of the second frequency in the compensation signal to minimise the power at the power detector.

16. An apparatus as defined in claim 15 further comprising a plurality of the second frequencies, and wherein the means for adapting is further for adapting at least one of the amplitude and the phase of each second frequency independently of other second frequencies.

17. An apparatus as defined in claim 15 wherein the inverter is at least one of a half-bridge circuit and a full-bridge circuit, such the first signal would be substantially rectangular if isolated from the coil.

18. An apparatus as defined in claim 15 wherein:
- the inductive coils has a resonant frequency, and
- the first frequency is the resonant frequency of the inductive coil.

19. An apparatus as defined in claim 15 wherein the compensation signal generator includes a processor, preferably a digital signal processor.

20. A method for transmitting power wirelessly by electromagnetic induction comprising:
- generating power at a first frequency and power at a second frequency;
- coupling the power into an inductive coil, whereby a first signal is created in the coil;
- generating a compensation signal with power in the second frequency;
- coupling the compensation signal into the inductive coil;
- detecting power in the coil at the second frequency;
- adapting at least one of the amplitude and the phase of the compensation signal to minimise the power detected in the detecting step.

21. A method as defined in claim 20 further comprising a plurality of the second frequencies, and wherein adapting step includes adapting at least one of the amplitude and the phase of each second frequency independently of other second frequencies.

22. A method as defined in claim 21 wherein the adapting step includes using a digital filter.

23. An apparatus as defined in claim 20 wherein:
- the inductive coils has a resonant frequency, and
- the first frequency is the resonant frequency of the inductive coil.

24. An apparatus as defined in claim 20 wherein the second generating step includes using a processor, preferably a digital signal processor.

25. A system for transmitting power wirelessly by electromagnetic induction from a primary unit to a secondary unit separable from the primary unit comprising:
- a primary unit comprising:
  - an inverter generating power at a first frequency and power at a second frequency;
  - a primary coil coupled to the inverter such that a first signal is created in the primary coil;
  - a generator for generating a compensation signal with power in the second frequency;
  - means for coupling the compensation signal into the primary coil;
  - a power detector for detecting power at the second frequency;
  - means for coupling a proportion of the signal in the primary coil to the power detector; and
  - means for adapting the amplitude and the phase of the compensation signal to minimise the power at the power detector;
- a secondary unit comprising:
  - a secondary coil; and
  - a rectification unit for rectifying AC power present on the secondary coil to produce DC power; and
- wherein power is transferred wirelessly from the primary unit to the secondary unit at the first frequency and further wherein the second frequency is attenuated such that the amount of power radiated by the primary coil and/or secondary coil at the second frequency is attenuated.

26. A system as defined in claim 25 wherein the inverter generates power at a plurality of the second frequencies, and wherein the means for adapting includes adapting at least one of the amplitude and the phase of each second frequency independently of the other second frequencies.

27. A system as defined in claim 25 wherein the generator includes a processor, preferably a digital signal processor.

28. An apparatus for transmitting power wirelessly by electromagnetic induction comprising:
- an inverter generating power at a first frequency and power at a second frequency;
- a first coil coupled to the inverter creating a first signal in the first coil;
- a generator generating a compensation signal with power in the second frequency;

at least one of a second coil in proximity to the first coil and a second transformer coupled to the first coil;

means for coupling the compensation signal into the at least one second coil/transformer;

at least one of a third coil separated from the first and second coils and a third transformer coupled to the first coil;

a power detector coupled to the at least one third coil/transformer for detecting power at the second frequency at least;

means for adapting the amplitude and the phase of the second frequency in the compensation signal to minimise the power at the power detector.

29. An apparatus as defined in claim 28 further comprising a plurality of the second frequencies, and wherein the adapting means includes means for adapting at least one of the amplitude and the phase of each second frequency independently of other second frequencies.

30. An apparatus as defined in claim 28 wherein the at least one second coil is in substantially the same orientation as the first coil.

31. An apparatus as defined in claim 28 wherein the third coil is substantially shielded from external radio signals.

32. An apparatus as defined in claim 28 wherein the generator includes a processor, preferably a digital signal processor.

33. An apparatus for transmitting power wirelessly by electromagnetic induction comprising:
   a driver circuit for generating a substantially rectangular waveform when in isolation by switching between two voltage levels;
   a first signal source coupled to the driver input;
   an inductive coil coupled to the driver output;
   a compensation signal including at least one harmonic frequency of the first signal source;
   means for coupling the compensation signal into the inductive coil;
   a power detector coupled to the inductive coil, the power detector adapted to detect the power in the at least one harmonic frequency in the inductive coil; and
   means for adapting the amplitude and the phase of each harmonic frequency in the compensation signal to minimise the power at the power detector.

34. An apparatus as defined in claim 33 wherein the driver circuit includes one of a half-bridge circuit and a full-bridge circuit.

35. An apparatus as defined in claim 33 wherein the first signal source is adapted to produce a digital signal at a clock rate higher than the fundamental frequency to be transmitted, such that a fundamental with reduced harmonic levels for the low harmonics is generated.

36. An apparatus as defined in claim 33 wherein the first signal source produces a rectangular signal at the fundamental frequency to be transmitted.

* * * * *